United States Patent Office 3,767,617
Patented Oct. 23, 1973

3,767,617
POLYCARBOXYLIC ACID CURING AGENT FOR POLYEPOXIDE RESIN MIXTURES
Hans Batzer, Arlesheim, Friedrich Lohse, Allschwil, and Rolf Schmid, Reinach, Basel-Land, Switzerland, assignors to Ciba-Geigy AG, Basel, Switzerland
No Drawing. Filed May 17, 1971, Ser. No. 144,267
Claims priority, application Switzerland, May 27, 1970, 7,834/70
Int. Cl. C08g 30/12
U.S. Cl. 260—47 EA                                      6 Claims

ABSTRACT OF THE DISCLOSURE

Curable moulding compositions, coating compositions and adhesives which contain a polyepoxide compound, for example a liquid polyglycidyl ether of bisphenol A or a liquid cycloaliphatic epoxide resin, and, as the curing agent, a liquid or relatively low-melting ester-tricarboxylic acid or ester-tetracarboxylic acid, which is obtained by reaction of a 3-hydric or 4-hydric aliphatic or cycloaliphatic polyalcohol, for example glycerol, 1,2,6-hexanetriol, trimethylolpropane or pentaerythritol, with glutaric anhydride or with glutaric acid and another aliphatic dicarboxylic anhydride.

The low viscosity and the high reactivity of the resin/curing agent mixture permits good curing at relatively low temperatures. The mouldings obtained are distinguished by good flexibility and by exceptionally high impact strength, tensile strength and flexural strength.

---

It is known to convert epoxide resins by means of dicarboxylic anhydrides and polycarboxylic anhydrides into moulded materials of high mechanical strength and heat resistance. It is possible to manufacture liquid resin-curing agent mixtures which are very suitable for use as casting resins, impregnating resins, laminating resins or adhesives. However, relatively high temperatures (above 80 to 100° C.) are always necessary for good curing.
agents for cycloaliphatic epoxide resins, which are con-
The use of the polycarboxylic anhydrides as curing stantly increasing in importance in the electrical industry because of their high tracking resistance and arcing resistance, is accompanied by a further disadvantage. The cured moulded materials possess inadequate flexibility and inadequate mechanical strength for many uses.

For this reason, attempts have been made to increase the flexibility by adding aliphatic tricarboxylic and tetracarboxylic acids. By using such polycarboxylic acids as curing agents it is also possible to effect the curing substantially more rapidly, especially with cycloaliphatic epoxide compounds. The tricarboxylic and tetracarboxylic acids however possess a high viscosity or are solid at room temperature. Since the reactivity of these compounds with cycloaliphatic epoxide resins is very high, too short a pot life results at higher temperatures, where the curable mixtures are of sufficiently low viscosity for processing. Using the tricarboxylic and tetracarboxylic acids in combination with cycloaliphatic epoxide resins is therefore not possible particularly in the case of large mouldings and mouldings containing inorganic fillers.

It has also already been proposed to use, instead of simple tricarboxylic or tetracarboxylic acids, the ester-carboxylic acids which are obtained by reaction of 1 mol of a n-hydric polyalcohol, such as glycerol or pentaerythritol, with n mols of a dicarboxylic acid or of a dicarboxylic anhydride.

Such curing agents have, for example, been described in U.S. patent specifications Nos. 2,890,194, 2,890,195, 2,890,210, 2,935,488 and 3,269,975 and in German patent specifications Nos. 1,227,659 and 1,227,660. All ester-polycarboxylic acids tested there, such as, for example, the adduct of 1 mol of glycerol and 3 mols of succinic anhydride, are however solid at room temperature and only melt at temperatures above 60° C. The processing with polyepoxide compounds can therefore only take place in the presence of major amounts of solvents or at temperatures above 60° C.

It has now been found, surprisingly, that ester-tricarboxylic acids or ester-tetracarboxylic acids, which are obtained by reaction of a trihydric or tetrahydric polyalcohol, either with glutaric anhydride alone or with glutaric acid and another aliphatic dicarboxylic anhydride, are liquid or possess relatively low melting points and display surprisingly low viscosities in the liquid state. The mouldings manufactured from cycloaliphatic epoxide resins and such ester-polycarboxylic acids as curing agents are additionally distinguished by an unexpectedly good flexibility and unusually high impact strength, tensile strength and flexural strength. This makes it possible to employ cycloaliphatic epoxide resins, especially those with an epoxide group present in the cycloaliphatic ring, for industrial fields of use which have hitherto been closed to this group epoxide resins notwithstanding their high electrical strengths. The low viscosity and the high reactivity of the resin/curing agent mixture also permits good curing at relatively low temperatures.

Admittedly, the general description of the above-mentioned patent specifications, for example of U.S. patent specification No. 2,890,210 or of German patent specification No. 1,227,660, contain the general comment that in general ester-carboxylic acids which are obtained by reaction of a polyol with a dicarboxylic acid or with a dicarboxylic anhydride are very suitable for use as curing agents for cycloaliphatic epoxide resins. These patents also contain a long, lexicographic list of dicarboxylic acids and dicarboxylic anhydrides, wherein glutaric acid and glutaric anhydride are listed amongst numerous others. Since, however, the experimental preparation of ester-polycarboxylic acids of glutaric acid is not described anywhere, and since a chemist could not possibly have deduced, from the lexicographic list of mere starting components, the surprising technical superiority of the particular ester-carboxylic acids derived from glutaric acid, the present, new and inventive concept was neither disclosed nor even remotely made obvious to an expert through the literature references mentioned.

The subject of the present invention is, therefore, curable mixtures which are suitable for the manufacture of mouldings, impregnations, coatings and adhesive bonds, and which are characterised in that they contain (a) a polyepoxide compound with an average of more than one epoxide group in the molecule and (b) as the curing agent, a polycarboxylic acid of the formula

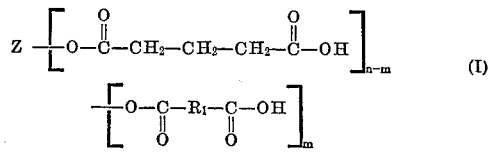

(I)

wherein $n$ denotes the number 3, 4 or 5, $m$ denotes the number 0, 1, 2, 3 or 4, but the value of $m$ must never exceed $(n-1)$, Z represents the hydrocarbon radical of a n-hydric aliphatic or cycloaliphatic polyalcohol, obtained by removal of the hydroxyl groups, and $R_1$ denotes the hydrocarbon radical of an aliphatic dicarboxylic acid other than glutaric acid, obtained by removal of the carboxyl groups.

The tricarboxylic, tetracarboxylic and pentacarboxylic acids of the Formula I which are derived from glutaric acid alone, so that $m$ denotes the number zero, possess particularly advantageous technical properties as curing agents for epoxide resins.

The synthesis of the polycarboxylic acids of the Formula I is advantageously carried out according to the following equation

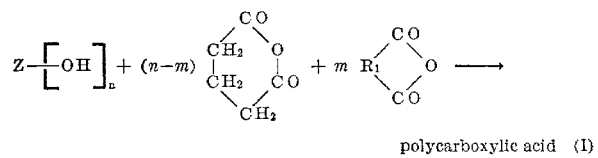

polycarboxylic acid (I)

In practice, the synthesis is carried out by first allowing the polyol to react with glutaric anhydride in the presence of a basic catalyst. When anhydride can no longer be detected in the reaction mixture, the second anhydride is added if desired, and the reaction is allowed to go to completion under the same conditions.

Possible triols, tetrols or pentols of the formula $Z(OH)_n$ are, for example: glycerol, butane-1,2,4-triol, hexane-1,2,6-triol, 2,4-dihydroxy - 3 - hydroxymethylpentane, 1,1,1 - trihydroxymethyl-ethane, 1,1,1 - trihydroxymeth-propane, pentaerythritol, erythritol, and the addition products of ethylene oxide or propylene oxide to one of the above polyols, xylose, ribose, xylitol, adonitol and glucose.

The following may be mentioned as example of anhydrides of the formula

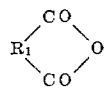

which are optionally conjointly used in the synthesis of the polycarboxylic acids (I): succinic anhydride, methylsuccinic anhydride, dodecenylsuccinic anhydride, dodecylsuccinic anhydride, dimethylglutaric anhydride, maleic anhydride, itaconic anhydride, citraconic anhydride and adipic anhydride.

The following may be mentioned especially as polyepoxide compounds with an average of more than 1 epoxide group in the molecule, which are employed in the curable mixtures according to the invention: alicyclic polyepoxides, such as epoxyethyl-3,4-epoxycyclohexane (vinylcyclohexene diepoxide),
limonene diepoxide,
dicyclopentadiene diepoxide,
bis-(3,4-epoxycyclohexylmethyl) adipate,
(3',4'-epoxycyclohexylmethyl)-3,4-epoxycyclohexanecarboxylate,
(3',4'-epoxy-6'-methylcyclohexylmethyl)-3,4-epoxy-6-mehylcyclohexanecarboxylate;
3-(3',4'-epoxycyclohexyl)-2,4-dioxaspiro-(5.5)-8,9-epoxyundecane,
3-(glycidyloxyethoxyethyl)-2,4-dioxaspiro-(5.5)-8,9-epoxyundecane, and
3,9-bis-(3',4'-epoxycyclohexyl)-spirobi-(meta-dioxane).

Diglycidyl ethers or polyglycidyl ethers of polyhydric alcohols, such as 1,4-butanediol or polyglycols, such as polypropylene glycols; diglycidyl ethehrs or polyglycidyl ethers of polyhydric phenols, such as resorcinol, bis-(p-hydroxyphenyl)-methane, 2,2-bis-(p-hydroxyphenyl)-propane (diomethane), 2,2-bis-(4'-hydroxy - 3',5' - dibromophenyl)-propane, 1,1,2,2-tetrakis - (p - hydroxyphenyl)-ethane or condensation products of phenols with formaldehyde, obtained under acid conditions, such as phenol novolacs and cresol novolacs; also, di- and poly-(β-methylglycidyl)-ethers of the abovementioned polyalcohols and polyphenols; polyglycidyl esters and poly-(β-methylglycidyl) esters of polybasic carboxylic acids, such as phthalic acid, terephthalic acid, tetrahydrophthalic acid and hexahydrophthalic acid; N-glycidyl derivatives of amines, amides and heterocyclic nitrogen bases, such as N,N-diglycidylaniline, N,N-diglycidyltoluidine, and N,N,N',N'- tetraglycidyl-bis-(p - aminophenyl) - methane; triglycidylisocyanurate; N,N'-diglycidyl-5,5-dimethylhydantoin.

Curing accelerators can furthermore be employed in the curing reaction; such accelerators are, for example, tertiary amines, their salts or quaternary ammonium compounds, for example 2,4,6-tris-(dimethylaminomethyl)-phenol, benzyldimethylamine, 1-methylimidazole, 2-ethyl-4-methylimidazole, 4-aminopyridine, and triamylammonium phenolate; or alkali metal alcoholates, such as, for example, sodium hexanetriolate.

The curing of the mixtures, according to the invention, of polyepoxide compound (a) and polycarboxylic acid (b) is preferably carried out at room temperature or at only slightly elevated temperature, that is to say in the temperature range or 18° C. to 30° C. The curing can, however, if desired also be carried out at higher temperatures, for example in the temperature range of 50–180° C.

The term "curing," as used here, denotes the conversion of the soluble, either liquid or fusible, polyepoxides into solid, insoluble and infusible, three-dimensionally crosslinked products or materials, accompanied, as a rule, with simultaneous shaping to give mouldings, such as castings, pressings, laminates and the like, or "sheet-like structures," such as coatings, lacquer films or adhesive bonds.

The curing can, if desired, also be carried out in 2 stages, by first prematurely stopping the curing reaction, whereby a curable pre-condensate (so-called "B-stage"), which is still fusible and soluble, is obtained from the epoxide component (a) and the curing agent (b). Such a pre-condensate can be stored for a greater or lesser period and can, for example, serve for the manufacture of "prepregs," compression moulding compositions or, especially, sintering powders.

The curable mixtures according to the invention can furthermore contain suitable plasticisers, such as dibutyl phthalate, dioctyl phthalate or tricresyl phosphate, inert organic solvents and so-called active diluents, such as, especially, monoepoxides, for example styrene oxide, butylglycid or cresylglycid.

Furthermore, the curable mixtures according to the invention can be mixed, in any stage before curing, with extenders, fillers and reinforcing agents, such as, for example, coal tar, bitumen, textile fibres, glass fibres, asbestos fibres, boron fibres, carbon fibres, mineral silicates, mica, quartz powder, titanium dioxide, hydrated aluminium oxide, bentonites, kaolin, silica aerogel or metal powders, such as aluminium powder or iron powder, and also with pigments and dyestuffs, such as carbon black, oxide pigments, titanium oxide and the like. Furthermore, other customary additives can also be added to the curable mixtures, for example flameproofing agents, such as antimony trioxide, agents for conferring thixotropy, flow control agents, such as silicones, cellulose acetobutyrate, polyvinyl butyral, waxes and stearates (which in part are also used as mould release agents).

The curable mixtures according to the invention can be manufactured in the usual manner, with the aid of known mixing equipment (stirrers, kneaders and rolls).

The curable epoxide resin mixtures according to the invention are above all employed in the fields of surface protection, the electrical industry, laminating processes and the building industry. They can be employed in a formulation suited in each case to the special end use, in the filled or unfilled state, optionally in the form of solutions or emulsions, as paints, lacquers, compression moulding compositions, dipping resins, casting resins, injection moulding formulations, impregnating resins and adhesives, tool resins, laminating resins, sealing and filling compositions, floor covering compositions and binders for mineral aggregates.

In the examples which follow, unless otherwise indicated, parts denote parts by weight and percentages denote percentages by weight. The relationship of parts by volume to parts by weight is as of the millilitre to the gram.

The following tricarboxylic and tetracarboxylic acids I–VI and the following epoxide resins A–C were used in the examples which follow:

MANUFACTURE OF THE TRICARBOXYLIC ACIDS AND TETRACARBOXYLIC ACIDS

Tricarboxylic acid I 256.4 g. (2.25 mols) of glutaric anhydride were fused, 0.05 ml. of benzyldimethylamine was added, the mixture was heated to 90° C. and 69.0 g. (0.75 mol) of glycerol were then run in over the course of 3 minutes, during which a weakly exothermic reaction occurred. After completion of the addition, the mixture was allowed to continue to react at 120°–130° C. until only slight anhydride bands at 5.35–5.56µ were detectable in the reaction mixture by IR spectra. This normally required 3 hours. The acid equivalent weight was then 142 (theory 144.7), and the end product was a resin of low viscosity.

Tricarboxylic acid II 256.4 g. (2.25 mols) of glutaric anhydride were fused and 0.05 ml. of benzyldimethylamine was added. 100.5 g. (0.75 mol) of hexane-1,2,6-triol were then added at approx. 90° C., in the course of which a weak exothermic reaction occurred. The reaction mixture was now allowed to continue reacting at 100°–110° C. until no further anhydride bands at 5.35–5.56µ were detectable by means of IR spectra, which required approx. 2½ hours. The end product was a light brown, viscous resin of acid equivalent weight 154 (theory 158.7).

Tricarboxylic acid III 256.4 g. (2.25 mols) of glutaric anhydride were mixed, at 70° C., with 0.05 ml. of benzyldimethylamine and 100.5 g. (0.75 mol) of 1,1,1-trimethylolpropane, in the course of which a weak exothermic reaction occurred. Thereafter the mixture was allowed to continue reacting at 125°–135° C. until no further anhydride bands were detectable in the IR spectrum of the reaction mixture, which required approx. 2–3 hours. The resulting light yellow, clear viscous resin then had an acid equivalent weight of 155 (theory 158.7).

Tricarboxylic acid IV 256.4 g. (2.25 mols) of glutaric anhydride were heated to 90° C. and mixed with 0.05 ml. of benzyldimethylamine and 90.0 g. (0.75 mol) of 1,1,1-trimethylolethane. After a weak exothermic reaction, the temperature in the reaction mixture was raised to 120–130° C. and the mixture was allowed to react for a further 2 hours at this temperature. After this, the anhydride bands in the IR spectrum had almost completely disappeared and the resulting clear, light yellow, viscous resin had an acid equivalent weight of 151.4 (theory: 154).

Tricarboxylic acid V 201 g. (1.5 mols) of 1,2,6-hexanetriol, 342 g. (3.0 mols) of glutaric anhydride and 0.1 ml. of benzyldimethylamine were dissolved in 500 ml. of pure dioxane and heated to 100–110° C. under nitrogen for 5 hours. 0.1 g. of hydroquinone and 146 g. (1.49 mols) of maleic anhydride were then added at the same temperature and the reaction was allowed to continue for 6 hours, until only a slight content of anhydride was still detectable. The reaction mixture was subsequently concentrated to constant weight at 90° C., finally under a high vacuum.

The brown-coloured, highly viscous end product had an acid equivalent weight of 152.5 (theory 153.3).

Tetracarboxylic acid VI 45.6 g. (0.4 mol) of glutaric anhydride and 13.6 g. (0.1 mol) of pentaerythritol were mixed with 0.2 ml. of benzyldimethylamine and heated to 170° C. under nitrogen until completely dissolved. The reaction was subsequently continued for 40 minutes at 150° C., after which no further anhydride bands at 5.53–5.56µ were detectable in the IR spectrum. The end product was a highly viscous light yellow substance and showed an acid equivalent weight of 146 (theory 148).

Pentacarboxylic acid VII 180.0 g. (1.0 mol) of D-glucose were mixed with 570.0 g. (5.0 mols) of glutaric anhydride, 2 ml. of benzyldimethylamine and 500.0 g. of pyrrolidone and warmed to 70° C.

The reaction mixture was then allowed to react for 8 hours at 70° C., a yellow, clear solution being obtained after 1 hour. Thereafter the entire reaction mixture was concentrated to constant weight at 160° C. under a high vacuum (0.3 mm. Hg).

The reaction product was a dark brown, highly viscous mass having an acid equivalent weight of 155.5 (theory: 150).

Pentacarboxylic acid VIII 68.0 g. (0.5 mol) of pentaerythritol were mixed with 57.0 g. (0.5 mol) of glutaric anhydride and 150.0 g. (1.5 mols) of succinic anhydride and warmed to 160° C., in the course of which an exothermic reaction occurred, which caused the internal temperature to rise to a maximum of 219° C. After completion of the exothermic reaction, 0.2 ml. of benzyldimethylamine was added to the reaction mixture and the latter was left to react for a further 2 hours at 160° C.

A light brown, clear, highly viscous reaction product having an acid equivalent weight of 125.3 (theory: 137.5) resulted.

EPOXIDE RESINS

Epoxide resin A

Cycloaliphatic epoxide resin (technical product) consisting mainly of the diepoxide of the formula

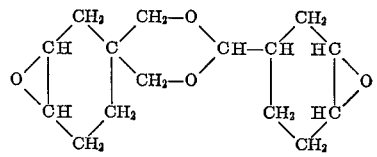

(=3-(3′,4′-epoxycyclohexyl) - 2,4 - dioxaspiro(5.5)-8,9-epoxyundecane), which is a viscous liquid at room temperature and has the following characteristics:

Epoxide content: 6.4 epoxide equivalents/kg.
Viscosity at 25° C.: 60,000–100,000

Epoxide resin B

Polyglycidyl-ether resin (technical product) manufactured by condensation of diomethane (2,2-bis-[p-hydroxyphenyl]-propane) with a stoichiometric excess of epichlorohydrin in the presence of alkali, consisting mainly of diomethane-diglycidyl-ether of the formula

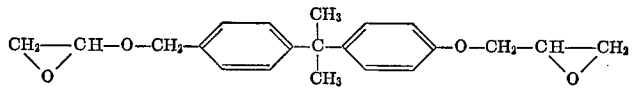

which is liquid at room temperature and has the following characteristics:
Epoxide content: 5.4 epoxide equivalents/kg.
Viscosity at 25° C.: 9,000–13,000 cp.

Epoxide resin C

Cycloaliphatic epoxide resin (technical product) consisting mainly of the diepoxide of the formula

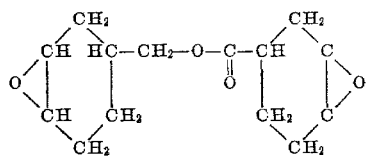

(=3',4'-epoxycyclohexylmethyl)-3,4 - epoxycyclohexanecarboxylate), which is liquid at room temperature and has the following characteristics:

Epoxide content: 7.1 epoxide equivalents/kg.
Viscosity at 25° C.: approx. 350 cp.

EXAMPLE 1

(a) 156 g. (=1.0 equivalent) of epoxide resin A, having an epoxide content of 6.4 epoxide equivalents/kg., were warmed to 80° C. and well mixed with 142 g. (=1.0 equivalent) of tricarboxylic acid I and 0.16 g. of dimethylbenzylamine, and the mixture was briefly subjected to a vacuum to remove the air bubbles. The mixture was now poured into aluminium moulds treated with a silicone release agent and prewarmed to 100° C. Sheets of sizes 135 x 135 x 4 mm., from which the appropriate test specimens were machined, were employed for determining the flexural strength, the deflection, the impact strength, the tracking resistance and the water absorption.

Test specimens according to DIN 16,946 were cast directly for the tensile test. After a hot cure for 4 hours at 80° C. and 12 hours at 140° C., mouldings having the following properties were obtained:

Flexural strength according to VSM 77,103: 13.9 kg./mm.$^2$
Deflection according to VSM 77,103: 13 mm.
Impact strength according to VSM 77,105: 17 cm. kg./cm.$^2$ (b) If 0.7 equivalent instead of 1.0 equivalent of epoxide resin A were used, otherwise employing the same composition and processing as in Example 1(a), mouldings having the following properties were obtained:

Flexural strength according to VSM 77,103: 14.4 kg./mm.$^2$
Deflection according to VSM 77,103: 15 mm.
Impact strength according to VSM 77,105: 37 cm. kg./cm.$^2$
Tensile strength according to DIN 16,946: 910 kg./cm.$^2$
Elongation at break according to DIN 16,946: 6%
Heat distortion point according to ISO R 75: 130° C.
Tracking resistance according to VDE 0303: KA3C
Arcing resistance according to VDE 0303: L4
Water absorption (after 24 hours at 20° C.): 0.5%

(c) When using 1.0 equivalent of epoxide resin B and otherwise employing the same composition and processing as in Example 1(a), mouldings having the following properties were obtained:

Flexural strength according to VSM 77,103: 6.0 kg./mm.$^2$ (without fracture)
Deflection according to VSM 77,103: >20 mm.
Impact strength according to VSM 77,105: 53 cm. kg./cm.$^2$
Water absorption (after 24 hours at 20° C.): 0.5%

(d) When using 0.7 equivalent of epoxide resin C instead of 1.0 equivalent of epoxide resin A, and otherwise employing the same composition and processing as in Example 1(a), mouldings having the following properties were obtained:

Flexural strength according to VSM 77,103: 13.3 kg./mm.$^2$
Deflection according to VSM 77,103: 12 mm.
Impact strength according to VSM 77,105: 52 cm. kg./cm.$^2$
Tensile strength according to DIN 16,946: 890 kg./cm.$^2$
Elongation at break according to DIN 16,946: 7%
Water absorption (after 24 hours at 20° C.): 0.4%

EXAMPLE 2

141 g. of epoxide resin C were warmed to 80° C. and well mixed with 108 g. of tricarboxylic acid II (corresponding to 0.7 equivalent of carboxylic acid per 1.0 equivalent of epoxide) and 0.14 g. of 1-methylimidazole. The mixture was briefly subjected to a vacuum and poured into the prewarmed moulds according to Example 1(a). After hot curing for 16 hours at 140° C., mouldings having the following properties were obtained:

Flexural strength according to VSM 77,103: 11.0 kg./mm.$^2$
Deflection according to VSM 77,103: 17 mm.
Impact strength according to VSM 77,105: 51 cm. kg./cm.$^2$
Tensile strength according to DIN 16,946: 770 kg./cm.$^2$
Elongation at break according to DIN 16,946: 6%
Heat distortion point according to ISO R 75: 72° C.
Water absorption, 24 hours at 20°: 0.4%

EXAMPLE 3

141 g. of epoxide resin C (=1.0 equivalent) were warmed to 80° C. and well mixed with 109 g. of tricarboxylic acid III (=0.7 equivalent) and 0.14 g. of 1-methylimidazole. After being briefly subjected to a vacuum, the mixture was poured into the prewarmed moulds according to Example 1(a) and subjected to hot curing for 16 hours at 140° C. The mouldings thus obtained had the following properties:

Flexural strength according to VSM 77,103: 11.6 kg./mm.$^2$
Deflection according to VSM 77,103: 14 mm.
Impact strength according to VSM 77,105: 22 cm. kg./cm.$^2$
Tensile strength according to DIN 16,946: 780 kg./cm.$^2$
Elongation at break according to DIN 16,946: 6%
Heat distortion point according to ISO R 75: 73° C.
Water absorption (after 24 hours at 20° C.): 0.4%

EXAMPLE 4

141 g. of epoxide resin C (=1.0 equivalent) were warmed to 80° C. and well mixed with 106 g. of tricarboxylic acid IV (=0.7 equivalent) and 0.14 g. of 1-methylimidazole. After being briefly subjected to a vacuum, the mixture was poured into the prewarmed moulds according to Example 1(a) and subjected to hot curing for 16 hours at 140° C. The mouldings thus obtained had the following properties:

Flexural strength according to VSM 77,103: 13.0 kg./mm.$^2$
Deflection according to VSM 77,103: 13 mm.
Impact strength according to VSM 77,105: 44 cm. kg./cm.$^2$
Tensile strength according to DIN 16,946: 780 kg./cm.$^2$
Elongation at break according to DIN 16,946: 7%
Heat distortion point according to ISO R 75: 76° C.

EXAMPLE 5

141 g. of epoxide resin C (=1.0 equivalent) were warmed to 80° C. and well mixed with 107 g. of tricarboxylic acid V (=0.7 equivalent) and 0.14 g. of 1-methylimidazole. After being briefly subjected to a vacuum, the mixture was poured into the prewarmed moulds according to Example 1(a) and subjected to hot curing for 16 hours at 140° C. The mouldings thus obtained had the following properties:

Flexural strength according to VSM 77,103: 12.6 kg./mm.²
Deflection according to VSM 77,103: 12 mm.
Impact strength according to VSM 77,105: 17 cm. kg./cm.²
Heat distortion point according to ISO R 75: 77° C.
Water absorption after 24 hours at 20° C.: 0.45%

EXAMPLE 6

185 g. of epoxide resin B (=1.0 equivalent) were warmed to 110° C. and well mixed with 146 g. (=1.0 equivalent) of tetracarboxylic acid VI and 0.18 g. of dimethylaminobenzylamine. After being briefly subjected to a vacuum, the mixture was poured into the prewarmed moulds according to Example 1(a) and subjected to hot curing for 4 hours at 80° C. and 12 hours at 140° C. The mouldings thus obtained had the following properties:

Flexural strength according to VSM 77,103: 9.2 kg./mm. (without fracture)
Deflection according to VSM 77,103: >20 mm.
Impact strength according to VSM 77,105: 65 cm. kg./cm.²
Water absorption after 24 hours at 20° C.: 0.3%

EXAMPLE 7

185 g. (1.0 equivalent) of epoxide resin B and 124 g. (0.8 equivalent) of pentacarboxylic acid VII were warmed to 80° C., and after brief subjection to a vacuum, the mixture was poured into the prewarmed mould according to Example 1(a). After a heat treatment of 4 hours at 80° C. and 12 hours at 140° C., hard mouldings of high toughness were obtained, which displayed the following properties:

Flexural strength according to VSM 77,103: 11.9 kg./mm.²
Deflection according to VSM 77,103: 19.1 mm.
Impact strength according to VSM 77,105: 62 cm. kg./cm.²
Tensile strength according to DIN 16,946: 7.8 kg./cm.²
Elongation at break according to DIN 16,946: 7.0%

EXAMPLE 8

101 g. (0.8 equivalent) of pentacarboxylic acid VIII were well mixed with 141 g. (1.0 equivalent) of epoxide resin A at 70° C., and the mixture was subjected to a vacuum and poured into the prewarmed mould analogously to Example 1(a). After a heat treatment of 4 hours at 70° C. and 12 hours at 140° C., mouldings having the following properties were obtained:

Flexural strength according to VSM 77,103: 15 kg./mm.²
Deflection according to VSM 77,103: 10 mm.
Impact strength according to VSM 77,105: 17.2 cm. kg./cm.²

We claim:
1. A curable composition of matter which consists essentially of (a) a 1,2-polyepoxide compound with an average of more than one epoxide group in the molecule and (b) as the curing agent, a polycarboxylic acid of the formula

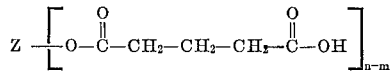

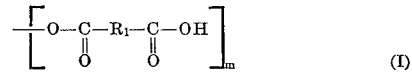     (I)

wherein $n$ denotes the number 3, 4 or 5, $m$ denotes the number 0, 1, 2, 3 or 4, with the proviso that the value of $m$ must never exceed $(n-1)$, Z represents the hydrocarbon radical of a n-hydric aliphatic or cycloaliphatic polyalcohol obtained by removal of the hydroxyl groups, and $R_1$ denotes the hydrocarbon radical of an aliphatic dicarboxylic acid other than glutaric acid, obtained by removal of the carboxyl groups.

2. A composition as claimed in claim 1, wherein in the formula $n$ denotes the number 3 or 4 and $m$ denotes the number 0, 1, 2 or 3.

3. A composition as claimed in claim 1, which contains a tricarboxylic or tetracarboxylic acid of the Formula I as the curing agent (b), with the symbol $m$ in the Formula I denoting the number zero.

4. A composition as claimed in claim 1, which contains a pentacarboxylic acid of the Formula I as the curing agent (b), with the symbol $m$ in the Formula I denoting the number zero.

5. A composition as claimed in claim 1, which contains a cycloaliphatic polyepoxide as the polyepoxide compound (a).

6. A composition as claimed in claim 1, which furthermore contains a curing accelerator.

References Cited

UNITED STATES PATENTS

| | | | |
|---|---|---|---|
| 2,683,131 | 7/1954 | Cass | 260—47 |
| 3,223,657 | 12/1965 | Weisfeld et al. | 260—47 |
| 2,890,195 | 6/1959 | Phillips et al. | 260—47 |
| 2,935,488 | 5/1960 | Phillips et al. | 260—47 |

WILLIAM H. SHORT, Primary Examiner

T. E. PERTILLA, Assistant Examiner

U.S. Cl. X.R.

117—161 ZB; 161—184; 260—2 EA, 13, 28, 30.4 EP, 30.6 R, 31.8 E, 59, 75 EP, 77.5 NC, 78.4 EP